Patented Apr. 8, 1952

2,591,768

UNITED STATES PATENT OFFICE 2,591,768

METHOD OF RESIN IMPREGNATING WOOD

Robert R. Austin, Pasadena, Calif.

No Drawing. Application August 22, 1947,
Serial No. 770,173

6 Claims. (Cl. 117—72)

This invention relates to the impregnation of wood and similar porous fibrous materials with monomeric i. e., at least partially polymerizable compounds which subsequently are polymerized in situ and change the physical properties of the wood. The practice of invention prevents the sweating which frequently occurs during polymerization and permits improvements in quality of product.

Wood is not dimensionally stable under changing conditions of humidity. High relative humidity causes swelling and water immersion causes swelling and cracking. Moreover, wood is porous in nature and its compressibility is a function of direction. Thus wood can be compressed more easily across the grain. This compressibility results in the loosening of tool handles and the like. Wood is not universally resilient and its impact and tensile strengths vary with the direction of the grain.

The impregnation of wood with resins frequently results in improving the physical properties thereof in several respects. Thus proper impregnation may increase impact, compressive and tensile strengths of wood and also increase elasticity. Impregnation may also harden wood and increase its resistance to water. Lastly, impregnation may improve dimensional stability.

It has been proposed heretofore to impregnate various types of wood with monomeric resins which are relatively fluid and of low viscosity. Subsequently the monomeric resins are polymerized in place in the wood with resultant development of a more viscous polymer.

Impregnation heretofore has been with either polymerized resins or unpolymerized resins in solution. In the case of dissolved polymerized resins the solvent which is required for preparing the resin solution must be evaporated from the wood, causing some exudation. Aqueous solutions of resin such as urea formaldehyde require long soaking followed by drying and final polymerization under heat and pressure. Impregnation with fluid polymerizable resins has been heretofore complicated by exudation of resin after impregnation and by surface tackiness accompanying such exudation. This tackiness appears to be due to under cure due possibly to effect of oxygen in the air.

In wood impregnation with polymerizable resins as practiced hereinbefore, the monomeric impregnant (usually containing a catalyst) is permitted to soak into the wood and thereafter the wood is withdrawn from the main body of the impregnant and polymerization is carried out. This may be accomplished simply by aging at room temperature, or the polymerization may be accelerated by heating. In either case, the impregnant tends to sweat or exude, with the result that the finished object invariably is tacky.

The tackiness and the exudation are probably due to the action of oxygen or other oxidizing influences which tend to inhibit polymerization. In any case, the wood heretofore impregnated has been relatively unsatisfactory since it presents finishing problems. Moreover, there is no assurance that exudation will not continue with the production of additional tackiness even after the surface has been cleaned several times.

Whatever the explanation of the exudation and the tackiness, I have discovered that it can be eliminated completely if the surface of the wood is sealed following impregnation, subsequent polymerization being conducted with the wood thus sealed.

Accordingly, in the treatment of wood involving impregnation thereof with a monomeric resin and the polymerization of the resin in situ in the wood, my invention contemplates the improvement which comprises sealing the surface of the wood following impregnation and prior to polymerization, subsequent polymerization being conducted with the wood in the sealed condition. Sealing may be conducted in several ways, but I prefer to seal by coating the wood with a congealable liquid and thereafter congealing the liquid on the surface of the wood. In my preferred practice, the wood following impregnation is coated with a waxy sealing compound and then aged in the coated condition for a period sufficient to permit at least partial polymerization of the resin, this aging being conducted at room temperature or thereabouts. Thereafter, while the wood is still coated it is heated to complete the polymerization.

The impregnation in accordance with my invention may be carried out in several ways but I prefer to operate as follows:

The wood is immersed in a body of the monomeric or partially polymerized resin disposed in a container. The wood is held by hooks, screens, or weights so that it does not float in the resin. The space within the container above the resin pool is evacuated, so that the air present in the wood is sucked out, permitting the fluid resin to penetrate the wood. After partial penetration has occurred, the body of resin with its contained wood is subjected to pressure to increase the penetration. In some cases, where woods are easily impregnated, it is sufficient merely to permit the entrance of atmospheric air into the container. In other cases, superatmospheric pressure should be employed.

Another procedure which is preferable in some cases involves the heating of the wood to a relatively high temperature, but below that where oxidation or destruction distillation will occur. The heated wood is then immersed in a cold body of the monomeric resin. The cooling of the wood by the monomeric resin causes it and the included air to contract, thereby permitting penetration to occur. This penetration may be increased by application of superatmospheric pressures if desired. During the impregnation of the heated wood in the cool monomeric syrup, the syrup should be circulated to prevent local overheating with resultant rapid polymerization, which would tend to seal the wood and prevent further penetration.

Following impregnation, by whatever method is employed, the wood is withdrawn from the bath of monomer and subjected to sealing. Prior to sealing it is desirable to wipe clean the wood surfaces.

The impregnated wood containing the monomer is then sealed promptly. Sealing preferably is accomplished by immersing the wood in a congealable liquid, withdrawing the wood and permitting the congelation to occur through cooling. A variety of sealing agents may be employed. I prefer to employ waxes and particularly high melting microcrystalline waxes such as the ceresin waxes. However, high melting fatty acids such as stearic acid or those of longer chain are useful. High melting soaps are satisfactory in some cases. High melting glycerides of fatty acids such as highly hydrogenated vegetable oils and high melting esters such as bees' wax are also useful.

Low melting alloys are useful in some instances, examples being Rose metal which melts at about 92° C. and is composed of 52% bismuth, 40% lead and 8% cadmium, Woods metal which melts at about 66° C. and is composed of 50% bismuth, 25% lead, 12½% tin and the balance cadmium. In some cases, where a high temperature for polymerization is desirable, an alloy having a melting point of about 180° C. and composed of 68% tin, 32% cadmium, is useful. Another alloy for use in such circumstances has a melting point of 145° C. and is composed of 50% tin, 32% lead and 18% cadmium.

If congealable organic liquids are employed they should be compatible with the resins and for this reason the high melting microcrystalline waxes such as those of the ceresin type are preferred.

Resins employed for wood impregnation should have a low viscosity and low vapor pressure in the monomeric form. They should yield a high ultimate solids content and should polymerize without the evolution of gas and at relatively low temperatures, since the higher the temperature the greater the tendency toward exudation. Moreover, the impregnants should yield a tough, final resin, and should be such that the addition of diluents, etc., permit modification of hardness. Lastly, the resins should be such that the impregnated wood may be worked i. e., cut. Grinding or cutting should not produce tacky resin due to heat softening of resin.

A variety of monomeric resins which upon polymerization form durable condensation products have been developed for wood impregnation. Among these are the allyl alcohol resins, i. e., resins derived from allyl alcohol by combination with polybasic acids; unsaturated polyester resins, i. e. resins derived from unsaturated polyhydric alcohols and unsaturated polybasic acids or from unsaturated polyhydric alcohols and saturated polybasic acids. Combinations of saturated polyhydric alcohols and unsaturated polybasic acids may also be employed and the compositions may contain other polymerizable compounds such as styrene.

Resins of the foregoing types can be produced with a wide range of hardness and other properties. In the monomeric or unpolymerized form they can be made with low viscosities which aid in impregnation and penetration. Generally the monomeric resins are produced as syrups of low viscosity. They may be polymerized with the aid of catalysts or through the use of moderate heat or both.

Among the unsaturated polyester resins which are suitable for use in the practice of the invention are those derived from maleic anhydride and allyl alcohol. Also useful are resins derived from maleic anhydride and glycol or glycerine, with or without drying oils such as linseed oil, which actually enters the condensation product. The resins may also contain monomeric styrene and one suitable example is derived from maleic anhydride, allyl alcohol and styrene.

The monomeric form in which the resin is used for impregnating purposes should have low viscosity and low vapor pressure. Thus the viscosity should range from 25 to 5000 cps. at atmospheric temperatures, and the vapor pressure should range from 2 mm. to 20 mm. of mercury at room temperature. As indicated above, polymerization should be accomplished without the evolution of gas and the resin should be such that excessive temperatures which would damage the wood are not required for final polymerization.

Specific examples of suitable resins for use in the practice of the invention include:

A. Phthalic acid esters of substituted glycols, such as is obtained by combination of phthalic acid and glycol monoacrylate. In the monomeric state the latter is a clear non-viscous liquid having a specific gravity of about 1.3. A suitable catalyst to aid polymerization of this resin is about 0.5% of benzoyl peroxide. The preparation of the monomer is described in U. S. Patent No. 2,384,119, Example 1.

B. The allyl ester of alpha hydroxy butyric acid, described in U. S. Patent No. 2,384,120 and polymerizable with 2% of benzoyl peroxide as catalyst.

C. The allyl ester of lactic acid, described in U. S. Patent No. 2,384,116. The monomeric ester has a boiling point of 154° C. at 4 mm. Hg, a specific gravity of 1.22 and a refractive index of 20° of 1.4466. Catalyzable with benzoyl peroxide 2%.

D. A mixture of monomeric and polymeric resins as follows:

| | Per cent |
|---|---|
| 2–5 dichlorostyrene | 33 |
| Poly 2–2 dichlorostyrene | 21.5 |
| Styrene monomer | 21 |
| Polystyrene | 11 |
| Hydrogenated terphenyl | 13 |
| Soln. containing 60% divinyl benzene | 0.5 |
| Total | 100.0 |

Catalyst 0.1% by weight of benzoyl peroxide.

As noted above, to facilitate operations it is desirable to incorporate a catalyst in the monomer. Various types of super oxides may be employed, for example, benzoyl peroxide, or tertiary butyl hydroperoxide.

The invention is applicable to practically any wood. Some woods, such for example, as maple, birch and oak, are easily impregnated and do not require superatmospheric pressures in the impregnating operation. Other woods, such as ponderosa pine, persimmon, magnolia and mahogany are relatively difficult to impregnate and for proper penetration require superatmospheric pressures. Woods including resinous pines and balsa, which are porous but in which the porosity is blind, are difficult to impregnate and require considerable time and rather high pressures, say pressure as high as 100 lbs. per sq. in.

The process of the invention is applicable to the treatment of many types of wooden articles, for example, golf club heads, handles for hammers and other tools, bowling balls, bowling pins, shoe trees, textile weaving spindles, mallets, casting rods, wooden salad bowls, wooden buckets and wooden containers generally, including wood stave tanks.

The invention will be understood more thoroughly in the light of the following detailed examples of preferred practices:

Example I

Wooden golf clubs heretofore have been made almost exclusively from persimmon. This wood is expensive and although it may be treated to improve its usefulness in golf club heads according to the practice of the invention, a number of other woods may likewise be used, including maple and magnolia.

In the manufacture of a golf club head from one of these woods, say magnolia, the wood is first shaped approximately to its final form with the usual wood working machinery. The rough-shaped heads are then placed in a sealed tank provided with vacuum and pressure connections and are prevented from floating by inverted wire baskets. Impregnant is introduced into the tank so that the wood is completely immersed. A suitable impregnant is a polyester resin, say one derived from maleic anhydride, allyl alcohol and styrene and having a viscosity in the monomeric or syrup state of about 100 cps. After the heads are covered, vacuum is applied to the tank and the pressure therein is reduced to about one-half inch of mercury. This degree of vacuum is maintained for about ten minutes, after which the vacuum line is closed and gas is admitted either at atmospheric pressure or at superatmospheric pressures. For example, with woods which are easy to impregnate, the impregnation may be completed simply by opening the vessel to the air. However, in the case of magnolia, which is rather difficult to impregnate, I prefer to submit it to air pressure of about 75 lbs. per sq. in. absolute for a period of fifteen minutes.

Following the pressure steps, the impregnated heads are removed from the monomeric bath and wiped clean. Immediately thereafter they are immersed in a bath of hot wax, say one of the ceresin type having a melting point of about 140° C. The temperature of treatment should be 10° to 20° above the melting point, say 150° F. to 160° F. After the articles have been dipped in the wax they are withdrawn, cooled and set aside at room temperature to undergo preliminary polymerization.

At temperatures in the neighborhood of 70° F. the heads should be aged for about two hours. At slightly more elevated temperatures, say 90° F. an aging time of half an hour may be sufficient. Following aging, the time of which is not particularly critical and may extend overnight, the golf club heads are again immersed in the hot wax tank and heated to a temperature of 200° F. or 225° F. for a period of thirty minutes. This completes the polymerization of the resin while keeping the surface sealed. Afterward the clubs are withdrawn and subjected to a final woodworking operation, or simply buffed.

The foregoing method is practical and economical because of the ease with which a uniform wax temperature may be obtained. Moreover, the wax acts as an excellent seal to prevent the entrance of air. Lastly the wax is good because it is easy to remove simply by withdrawal of the wood from the final heat curing stage.

I have found that woods treated in accordance with the practice of this example are free from tackiness and lend themselves admirably to polishing.

Magnolia, in the raw state, tends to warp severely. Its tendency to warp is entirely overcome by impregnation in accordance with the invention. Moreover, the toughness of magnolia treated in accordance with the invention is very high.

With untreated persimmon, it is essential that the grain run parallel to the striking face of a golf club head. This leads to waste of material. However, wooden club heads made in accordance with my invention have relatively uniform properties both across and with the grain, so that less care need be taken in matching the grain to the piece. This leads to economies of raw material.

As indicated above, the heads may be cut to final shape prior to impregnation and then merely buffed after final cure. However, if precise dimensions or shape are required it may be desirable to rough shape the wood prior to impregnation, with final shaping and finishing after final cure. I have found that there is some unequal swelling of the wood during impregnation, the greatest swelling being in the direction at right angles to the grain. It is therefore necessary to final size such symmetrical objects as balls, after cure.

Example II

Bowling pins ordinarily are turned out of hard maple. There are two principal points of wear, i. e. on the side of the pin about half way up where the ball strikes, and at the base of the pin at the edge where it rests against the floor. The pins are of standard weight and behavior. In order to maintain present performance of bowling pins and simply increase durability they should not be uniformly impregnated nor should the entire surface be impregnated. On the other hand, it is merely necessary to impregnate a band around the pin where the ball strikes and another band at the base of the pin.

In the application of the invention, the bowling pin is turned in the usual form except that a slight annular projection, say ¼ inch deep and ½ inch wide, is left on the bottom edge of each pin. Thereafter, the pin is dipped with the bottom down so as to cover an area ⅓ up to the central band with wax, at the same time covering the central bottom portion of the pin. After this wax has cooled and congealed, the pin is up-ended and the top portion is similarly wax dipped down to the central band. The pin is then placed in a lathe and the annular projection is cut off to leave a flat bottom on the pin with a central wax-sealed section and an unsealed outside annulus. There are thus two exposed wood surfaces, one adjacent the annular central band, the other the annulus exposed on the bottom edge of the pin by cutting on the lathe. The rest of the pin surface is sealed with the wax.

A pin in this condition is immersed in a body of monomeric syrup of suitable composition and viscosity and containing the necessary catalyst. Vacuum is applied until there is a pressure of about 10 lbs. per sq. in. Air is thus sucked out of the exposed portions of the pin, i. e., the portions that are unwaxed, and penetration by the syrup occurs. Thereafter, the pressure on the body of syrup containing the pin is increased to atmospheric, with resultant further impregnation of the central band and the exposed bottom annulus.

The pin is withdrawn from the syrup bath, wiped clean, and then given a wax dip to cover all its surfaces. The dipped pin is then allowed to age at room temperature for a period of a few hours. Thereafter, instead of finishing the polymerization of the resin by dipping in hot wax, the pin is simply baked in an oven for about 15 minutes at a temperature of 225° F. During the baking operation, the wax melts and runs off, leaving the final pin. The central band is adequately impregnated, since at this point the end grain of the wood is much exposed and impregnation is relatively simple. The other point of wear, i. e. the outside base portion of the pin is also thoroughly impregnated. The balance of the pin is left unimpregnated so that the change in weight and balance is slight and negligible from the standpoint of pin performance under impact. However, pins treated as described above have improved wearing qualities and will outlast even the best of untreated maple pins by several times.

In order to produce a bowling pin having a behavior in the alley duplicating that of present pins, it is possible to take an ordinary bowling pin and cut a concentric cavity in the bottom. Thereafter, the entire pin is treated as in the case of Example I and its entire surface is impregnated to a substantial depth. The size of the cavity is adjusted so that this pin, despite the increase in density in its outside portions, will behave precisely like a standard bowling pin.

*Example III*

A preferred treatment of shoe lasts in accordance with the invention is conducted approximately as follows:

A maple shoe last is finished to size, then heated to a temperature of about 300° F., and in this condition is immersed in a cold circulating bath of unpolymerized resin, say the resin employed in either of the two foregoing examples. The resin should be maintained at a temperature not to exceed about 90° F. in order to prevent polymerization due to local overheating during the impregnation period. As the wood cools in the cold circulating bath of syrup, the air which it contains and the wood both contract, pulling the impregnant well into the surface of the last, say to a depth of ⅛ inch to ¼ inch. This impregnation step takes about ten or fifteen minutes, after which the impregnated lasts are removed, wiped, and subjected to the wax treatment already described in connection with Example I, polymerization being completed while the surface of the last is sealed by the wax.

*Example IV*

Ash or hickory hammer handles are treated as follows:

The end of the finished handle which is to go into the head is dipped into a bath of the monomeric resin. Alternatively, all of the handle surface except the portion to be placed in the tool are given a preliminary coat of varnish and thereafter the handles are immersed endwise in the bath of monomeric resin. In either case, a vacuum is employed to withdraw air from the end of the handle while it is immersed in the syrup, and thereafter pressure is employed to increase impregnation. Subsequent treatment for polymerization of the impregnated piece is conducted in two stages after a wax dip, as in Example I.

*Example V*

Croquet balls, as made heretofore, have a resilience which varies with the grain. In other words, the wood is more compressible across the grain than it is with the grain. Croquet balls having increased durability and also more uniform resilience may be produced in accordance with the invention by impregnating them in accordance with any of the foregoing examples, preferably in accordance with Example I. The balls are rough sized prior to impregnation and after impregnation and polymerization are subjected to a final sizing operation to overcome the distortion due to swelling during impregnation. Croquet mallet heads and handles may be similarly improved.

*Example VI*

The wood to be impregnated is placed in a heated oven say at 250° F. and placed in a container, which is then subjected to vacuum. The vacuum is maintained for sufficient time to remove any moisture, say five minutes, and the monomeric resin of suitable viscosity is permitted to flow into the evacuated container to cover the wood. The pressure is then released and air pressure permitted to enter the evacuated container and force the resin into the wood. In cases of difficulty impregnated wood, superatmospheric pressure can be applied.

The impregnated wood is removed from the resin bath, then drained free of resin as in previous examples, wiped, dipped in a sealing compound such as wax, aged to permit preliminary polymerization and then the cure is completed while the surface is sealed. This practice will produce the most thoroughly impregnated product with minimum moisture content, so that it can be employed as electrical insulation or under conditions of extreme exposure or moisture.

If desired, color can be incorporated in the unpolymerized impregnant so that the wood is uniformly dyed adjacent its outer surfaces.

As indicated above, prior practice of wood impregnation with resins frequently has required use of a solvent to impart desirable fluidity to the resin. When solvents are so utilized, no vacuum can be utilized to aid impregnation because of the withdrawal of solvent from the resin by selective evaporation. Disadvantage also arises from the fact that after impregnation a considerable time is required to eliminate the solvent from the impregnated wood, first by migration to the surface and then by evaporation. These solvents in general are combustible and represent a fire hazard.

Further disadvantage arising from such processes is due to the fact that only a limited quantity of resin can be dissolved by the usual solvent and still produce a mixture of suitable viscosity. It is therefore difficult if not impossible, to substantially fill the pores of the wood with the resin unless multiple impregnations are practiced, a practice which is both expensive and tedious. In contrast, my invention may be practiced employing monomeric polyester type resins containing little or no solvent and having a vapor pressure which is in the range of a half to one inch of mercury. With such an impregnant, no difficulty is encountered due to the use of vacuum.

Although the invention has been described in detail with respect to wood, which represents its preferred field of application, it is generally useful with mass fibrous materials which are sufficiently porous to be impregnated. Thus it is applicable to molded articles of pressed paper, pressed wood fibre, felt, glass floc, and the like. Thus considered, the invention is a method for producing fibrous-reinforced shaped resinous articles in which the shaping precedes impregnation in whole or in part.

I claim:

1. A process of wood treatment which comprises impregnating the wood to a substantial depth with a monomeric liquid which is capable of forming a polymeric resin and which is substantially solventless, coating the impregnated wood soon thereafter and before substantial polymerization of the liquid has occurred with a liquid sealant that is compatible with the monomeric liquid and is selected from the group consisting of high melting microcrystalline waxes, higher fatty acids containing a chain of at least 18 carbon atoms, high melting point soaps, and esters of higher fatty acids, congealing the resulting coating on the wood by cooling, and aging the wood covered with the congealed coating for a period sufficient to permit polymerization to proceed to the point where the resin is set, the monomeric liquid being such that it polymerizes at least partially at a temperature substantially below the melting point of the sealant.

2. Process according to claim 1 in which the wood is impregnated with the monomeric liquid by immersing the wood in the monomeric liquid, subjecting the wood and the monomeric liquid in which it is immersed to reduced pressure, and subsequently increasing the pressure on the wood and the monomeric liquid in which it is immersed.

3. Process according to claim 1 in which the wood is impregnated by heating it and immersing it while heated in a cool body of monomeric liquid to cool the wood and gases included therein and thereafter circulating the cool liquid in contact with the wood.

4. Process according to claim 1 in which the wood is impregnated by heating it, subjecting the heated wood to vacuum to suck gas from its pores, and bringing the resulting evacuated wood into contact with the monomeric liquid.

5. A process of wood treatment which comprises impregnating the wood to a substantial depth with a monomeric liquid which is capable of forming a polymeric resin and which is substantially solventless, coating the impregnated wood soon thereafter and before substantial polymerization of the liquid has occurred with a liquid sealant that is compatible with the monomeric liquid and is selected from the group consisting of high melting microcrystalline waxes, higher fatty acids containing a chain of at least 18 carbon atoms, high melting point soaps, and esters of higher fatty acids, congealing the resulting coating on the wood by cooling, aging the wood covered with the congealed coating for a period sufficient to permit polymerization to proceed to the point where the resin is set, the monomeric liquid being such that it polymerizes at least partially at a temperature substantially below the melting point of the sealant, and thereafter heating the wood to complete the polymerization.

6. A process of wood treatment which comprises impregnating the wood to a substantial depth with a monomeric liquid which is capable of forming a polymeric resin and which is substantially solventless, coating the impregnated wood soon thereafter and before substantial polymerization of the liquid has occurred with a liquid sealant that is compatible with the monomeric liquid and is selected from the group consisting of high melting microcrystalline waxes, higher fatty acids containing a chain of at least 18 carbon atoms, high melting point soaps, and esters of higher fatty acids, congealing the resulting coating on the wood by cooling, aging the wood covered with the congealed coating for a period sufficient to permit polymerization to proceed to the point where the resin is set, the monomeric liquid being such that it polymerizes at least partially at a temperature substantially below the melting point of the sealant, and thereafter heating the wood in a liquified bath of a sealant selected from said group to complete the polymerization.

ROBERT R. AUSTIN.

REFERENCES CITED

The following references are of record in the file of this patent:

UNITED STATES PATENTS

| Number | Name | Date |
| --- | --- | --- |
| 1,217,559 | Broady | Feb. 27, 1917 |
| 1,721,135 | Ross | July 16, 1929 |
| 1,765,944 | Seel | June 24, 1930 |
| 2,020,172 | Cotchett | Nov. 5, 1935 |
| 2,103,841 | Calvert | Dec. 28, 1937 |
| 2,147,824 | Webb | Feb. 21, 1939 |
| 2,248,512 | Philip et al. | Jan. 8, 1941 |
| 2,420,720 | Pechukas et al. | May 20, 1947 |
| 2,434,106 | Flood et al. | Jan. 6, 1948 |